Patented Mar. 14, 1950

2,500,152

UNITED STATES PATENT OFFICE 2,500,152

VULCANIZED DEHYDROCHLORINATED MATERIAL

Samuel J. Cohen, Rochester, and Walter E. Scheer, Jackson Heights, N. Y.; said Scheer assignor to said Cohen No Drawing. Application August 6, 1946, Serial No. 688,694

4 Claims. (Cl. 260—125)

This invention relates to a vulcanized product of the type commonly made by vulcanizing drying oils, known as factice, and used, for instance, as a filler or extender for rubber. It is conventional to treat rapeseed, linseed, China-wood, soya bean, or like drying oil with a sulfur curing agent, to give a thickened, generally crumbly or weak solid material.

We have now discovered a method that makes unnecessary the use of any vegetable drying oil and gives a non-inflammable product.

Briefly stated, the invention comprises the method of and the product resulting from vulcanizing an originally chlorinated and then incompletely dehydrochlorinated paraffin hydrocarbon, the dehydrochlorination being only to the stage at which approximately maximum unsaturation is produced, as shown by the iodine number, and short of the stage at which there are developed large proportions of inert ring and objectionably dark compounds.

In our copending application Serial No. 678,678, filed by us on June 22, 1946, for Dehydrochlorination of chlorinated hydrocarbons, and now abandoned, of which application the present is a continuation in part, we have described a dehydrochlorinated product that although still maintaining a large proportion of chlorine, has an iodine number and therefore unsaturation of the same order as previously realized in practically completely dehydrochlorinated products.

In this copending application there is described chlorination in usual manner of a paraffin hydrocarbon containing 6 to 27 carbon atoms to the molecule to the stage at which there is present in the chlorinated material about 1 chlorine atom for every 2 to 6 carbon atoms in the molecule, or expressed in percentage, about 25% to 70% of chlorine on the weight of the chlorinated material. Then the chlorinated hydrocarbon is dehydrochlorinated in manner that is conventional except that the dehydrochlorination is discontinued when there is still left in the product ¼ to ¾ the original content of chlorine. Thus the dehydrochlorination may be effected with the use of a catalyst such as finely divided copper and at a temperature of approximately 250° for a period of an hour or so and to an iodine number of about 75 to 150. It is significant that this iodine number is in about the same range as found by Gardner and Bielouss (Industrial and Engineering Chemistry, 14, 619, 1922). They state that while complete dehydrochlorination of their chlorinated hydrocarbon should give a product of iodine number around 254, they have found actually an iodine number of only 70 to 130.

We consider that the combination in our dehydrochlorinated material of a large percentage of remaining chlorine and of high iodine number (unsaturation) to be due to discontinuing the dehydrochlorination before unsaturated compounds first formed are subsequently polymerized or converted to ring compounds that do not show the same high unsaturation as the compounds before such secondary change.

As the dehydrochlorinated originally chlorinated hydrocarbon to be used in the making of the vulcanized material of the present invention, we use the partially dehydrochlorinated product described in the said copending application, and particularly the product resulting from removing by dehydrochlorination about one-fourth to three-fourths of the chlorine originally present in a chlorinated paraffin hydrocarbon containing 1 chlorine for 2 to 6 carbon atoms present. This means that, after dehydrochlorination, there remains chlorine in the proportion of about one-fourth to three-fourths of one chlorine atom for 2 to 6 carbon atoms. These products have iodine numbers of approximately 75 to 150.

Using such incompletely dehydrochlorinated material we obtain important advantages. The vulcanized compositions made from the dehydrochlorinated material described in the said application for patent contain a very low proportion if any of originally inert material such as the saturated ring compounds that are formed as secondary reactions when the dehydrochlorination is carried to practical completion. The vulcanized material is also less dark than that made with the more completely dehydrochlorinated material, is less inflammable and ordinarily non-flammable, and is lower in cost due to the fact that there is a large increase in weight of material for a given amount of raw material used when a high proportion of chlorine such as stated is left in the finished product.

For compounding with the selected dehydrochlorinated material, there is used a curing agent that is conventional in vulcanizing drying oils. Sulfur monochloride is preferred. There may be used, however, other sulfur curing compounds as, for example, sulfur itself, either alone or mixed with sulfur monochloride. Also there may be used accelerators of vulcanization that are usual in vulcanizing the drying oils.

The curing agent is used in the same proportion to the dehydrochlorinated chlorinated hydrocarbon as to drying oils in usual factice manufacture. We use to advantage 10 to 40 parts of sulfur monochloride for 100 parts of the dehydrochlorinated material and for best commercial operations 15 to 30 parts by weight of the curing agent for 100 parts of the dehydrochlorinated material. The higher the proportion of curing agent within the range given, the firmer is the factice produced. When elemental sulfur is used as the curing agent, its proportion should be less than that of the sulfur monochloride, say about half the amount of the monochloride used.

The dehydrochlorinated material, curing agent and accelerator, if any is to be used, are mixed in the cold and maintained in contact with each other and at temperatures below those at which the reaction becomes uncontrollable or until the resulting material comes to be of rubbery consistency and nature and the curing agent is consumed. When sulfur monochloride is the curing agent, cold or approximately room temperature curing is used. When sulfur is the curing agent, higher temperatures are required such as 250° to 400° and preferably 300° to 380° F., for a period of about 2 to 5 hours, the time required being shorter for the higher temperatures within the ranges recited.

Details of the curing conditions not stated herein are those that are usual in vulcanizing drying oils.

The invention will be further illustrated by detailed description in connection with the following specific examples.

Example 1

One hundred parts of dehydrochlorinated chlorinated paraffin wax, containing originally about 41.5% of chlorine and after the dehydrochlorination 18.7% of chlorine and having then an iodine number of 135, were mixed with 20 parts of sulfur monochloride. This dehydrochlorinated material contains 1 chlorine atom for approximately 11 carbon atoms. The mixture was made at room temperature, the sulfur monochloride being added slowly but continuously over the course of 20 minutes and the whole being kept stirred and cooled to approximately room temperature or slightly thereabove during the addition. Within a few minutes after the last of the monochloride had been added, the reaction was complete. The product was a tacky solid.

Example 2

The procedure of Example 1 was repeated except that the proportion of the sulfur monochloride was made 30 parts for 100 parts of the dehydrochlorinated material. The product in this case was a dry, crumbly solid.

Example 3

In another example the sulfur monochloride was used in the proportion of only 10 parts for 100 parts of the dehydrochlorinated material. The result here was a very viscous liquid useful in giving with rubber a somewhat less firm product than is obtained with the solid factice.

Example 4

The procedure of Examples 1 to 3 is repeated with the substitution, on a pound for pound basis, of a different specimen of the dehydrochlorinated material for that used in the previous examples.

In this example, a chlorinated paraffin wax containing originally about 41.5% of chlorine was dehydrochlorinated as described in the said copending application to a chlorine content of 24.5%. This corresponds to 1 Cl for about 7 carbons.

Products obtained in the curing with sulfur monochloride were similar to those made in Examples 1 to 3.

Example 5

Dehydrochlorinated paraffin of the kind described in Example 1 was mixed with 10% of its weight of powdered sulfur. The mixture was then warmed to 380° F. for about 3 hours. The product was a good factice.

It will be understood also that it is intended to cover all changes and modifications of the examples of the invention herein chosen for the purpose of illustration which do not constitute departures from the spirit and scope of the invention.

What we claim is:

1. In making a vulcanized product, the method which comprises subjecting a chlorinated paraffin hydrocarbon containing 6 to 27 carbon atoms to the molecule and 1 chlorine atom for each 2 to 6 carbon atoms to dehydrochlorination, discontinuing the dehydrochlorination when the proportion of remaining chlorine is ¼ to ¾ of the chlorine originally present in the chlorinated hydrocarbon and the iodine number of the partially dehydrochlorinated material is approximately 75 to 150, admixing a vulcanizing agent with the partially dehydrochlorinated material and maintaining contact of the said agent and material until reaction between them is substantially complete, to give a vulcanized product.

2. The method described in claim 1, the vulcanizing agent being sulfur monochloride in the proportion of 10 to 40 parts of the sulfur monochloride for 100 parts of the partially dehydrochlorinated material.

3. The method described in claim 1, the said vulcanizing agent being sulfur and the mixture of sulfur with the partially dehydrochlorinated material being maintained at the elevated temperature of the sulfur vulcanization until the vulcanization is completed.

4. The method described in claim 3, the hydrocarbon used being paraffin wax.

SAMUEL J. COHEN.
WALTER E. SCHEER.

REFERENCES CITED

The following references are of record in the file of this patent:

UNITED STATES PATENTS

| Number | Name | Date |
|---|---|---|
| 1,384,423 | Bielouss | July 12, 1921 |
| 1,384,447 | Gardner et al. | July 12, 1921 |
| 1,446,039 | Gardner | Feb. 20, 1923 |
| 2,124,598 | Turner | July 26, 1938 |
| 2,152,890 | Kipper | Apr. 4, 1939 |
| 2,199,633 | Kipper | May 7, 1940 |
| 2,331,005 | Story et al. | Oct. 5, 1943 |
| 2,341,453 | Lieber et al. | Feb. 8, 1944 |
| 2,348,080 | Lincoln et al. | May 2, 1944 |
| 2,396,788 | Hoffman | Mar. 19, 1946 |